Patented July 19, 1938

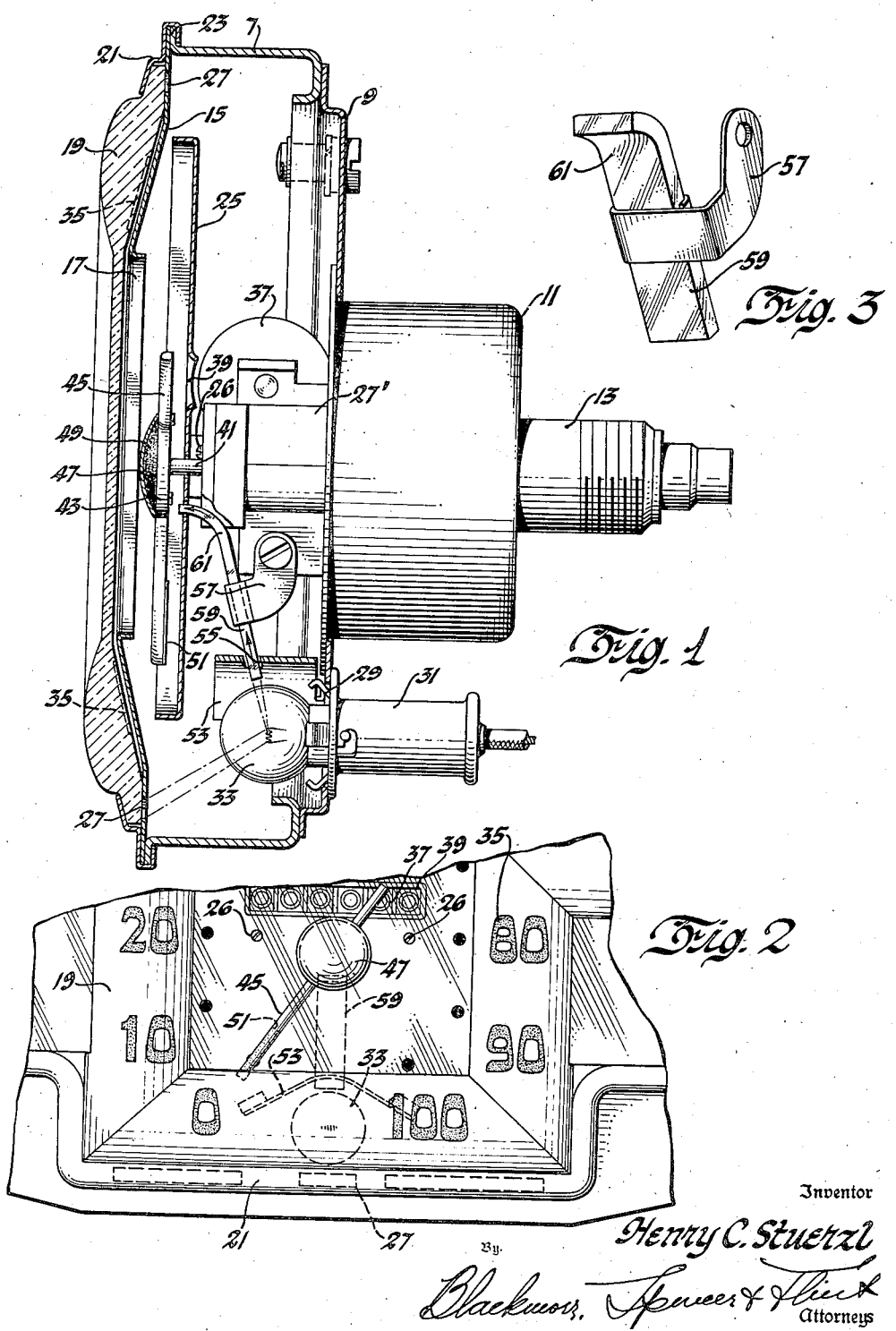

2,124,089

UNITED STATES PATENT OFFICE 2,124,089

ILLUMINATED SPEEDOMETER

Henry C. Stuerzl, Flint, Mich., assignor to General Motors Corporation, Detroit, Mich., a corporation of Delaware Application August 26, 1937, Serial No. 160,969

3 Claims. (Cl. 240—2.1)

This invention relates to the illumination of indicating instruments and in addition to other uses, it is intended particularly for the illumination of a combined speedometer and odometer such as is used on motor vehicles.

An object of the invention is an illuminating provision for such a combined instrument whereby the light from a suitable source is used to illuminate only those markings and parts associated therewith to the end that an observer may quickly determine the reading of the instrument and not be confused by directly transmitted light.

Another and more specific object is concerned with an improvement in the means for the transmission of light from the source to a part of a rotating pointer, the latter adapted to be associated with illuminated characters on a glass plate.

Other objects and advantages will be understood from the following description.

The invention is illustrated by the accompanying drawing in which:

Figure 1 is a transverse section through the improved instrument.

Figure 2 is a view in front elevation.

Figure 3 is a detail in perspective.

Referring to the drawing a housing is formed by a boundary wall of metal 7 to which is secured a rear wall 9 and to the latter is attached a cup 11 carrying instrument operating mechanism for a combined odometer and speedometer. The cup is shown with a boss 13 for the passage of a driven shaft not shown. At the front of the housing is shown an opaque plate 15 having a large central opening 17. Overlying plate 15 is a "Lucite" face 19. An annular ring 21 is clamped over the housing flange 23, the extremity of plate 15 and the "Lucite" face 19. Within the enclosure so formed is an inner opaque metal plate 25. This plate may be secured as at 26 to the face of the instrument frame 27. Plate 25 extends radially beyond the wall of opening 17 in plate 15. Near the outer margin of plate 15 there are openings 27. Suitable fastening means 29 secure a socket 31 in an opening in plate 9, the socket carrying a light bulb 33 within the housing. From the light source light is distributed around the wall 7 and passes through the openings 27 into the "Lucite" face 19. On the glass are etched markings 35 from which the light is transmitted to the observer.

An odometer of conventional form is represented by numeral 37 and is supported by frame 27'. Its figures are lighted by the light within the housing coming from source 33. The reflected light is seen by the observer through "Lucite" 19, opening 17 and through opening 39 provided for the purpose in the inner plate 25.

The speedometer is provided with a stem 41 extending through an aperture in plate 25. To this stem is secured the central part 43 of a pointer 45. Clamped to the central part of the pointer is an opaque disc 47. The pointer is formed from any suitable transparent material such as "Lucite". Upon the front face of the central part 43 is a coating of white paint marked 49. On the rear face of the pointer adjacent its tip is another painted surface marked 51. It is intended that light from the source be transmitted to the central region 43, then transmitted by internal reflection to the region 51 from which it is reflected to the observer. To make best use of the light from the light source there is shown a reflector 53, the reflector being provided with an opening 55. A clamp 57 secures a bar 59 of transparent material such as "Lucite" to the instrument frame. One end of this bar passes through opening 55 and extends to a point adjacent the light source. At its other end the "Lucite" bar is curved as at 61 so that its extremity extends axially toward the painted center 43 of the pointer.

By the construction described above the markings 35 on the glass are the only parts of the glass which are visible at night. Through the glass 17 and inwardly of the markings, the observer sees the light reflected from the surface 51 of the pointer. The position of part 51 relative to the marking on the glass gives the speedometer readings. The odometer readings are seen through the "Lucite" 19, the opening 17, the transparent part of the pointer and the opening 39. By this construction the light from the source is very advantageously used particularly because the "Lucite" bar takes the light from immediately adjacent the source and by internal reflection directs it axially to the painted surface of the pointer.

I claim:

1. An indicating instrument having a housing, a source of light therein, a transparent disc covering said housing, said transparent disc having markings, means for transmitting light from said source through said glass to be reflected from said markings, opaque plates at the rear of said transparent disc, a rotatable member between said opaque plates, said rotatable member having a first painted region, and a second painted region spaced from the first region whereby light received by the first region is transmitted by internal reflection to the second region and reflected therefrom to an observer, and a bar of transparent material within said housing associated with said source and adapted to transmit light by internal reflection from said source to said first mentioned region.

2. The invention defined by claim 1, the first one of said painted regions being located substantially at the axis of rotation of said rotatable member.

3. The invention defined by claim 1, said first painted region being substantially at the axis of rotation of said movable member, said light source being located adjacent the periphery of said housing, said transparent bar extending radially from said source inwardly and bent to extend axially to a point adjacent said first region.

HENRY C. STUERZL.